United States Patent [19]
Arvidsson

[11] Patent Number: 6,082,901
[45] Date of Patent: Jul. 4, 2000

[54] HYDRAULIC AXIAL BEARING

[75] Inventor: Thomas N. Arvidsson, Linkoping, Sweden

[73] Assignee: Andritz Inc., Muncy, Pa.

[21] Appl. No.: 08/894,029

[22] PCT Filed: Feb. 6, 1996

[86] PCT No.: PCT/US96/01435

§ 371 Date: Aug. 7, 1997

§ 102(e) Date: Aug. 7, 1997

[87] PCT Pub. No.: WO96/24777

PCT Pub. Date: Aug. 15, 1996

(Under 37 CFR 1.47)

[30] Foreign Application Priority Data

Feb. 7, 1995 [SE] Sweden ................................. 9500424

[51] Int. Cl.$^7$ ..................................................... F16C 32/06
[52] U.S. Cl. ........................................... 384/124; 384/121
[58] Field of Search ..................................... 384/124, 121, 384/131

[56] References Cited

U.S. PATENT DOCUMENTS

| | | | |
|---|---|---|---|
| 1,268,575 | 6/1918 | Iskols | 384/124 |
| 3,146,037 | 8/1964 | Hooker | 384/121 |
| 4,915,510 | 4/1990 | Arvidsson | 384/121 X |
| 5,219,447 | 6/1993 | Arvidsson | 384/121 X |
| 5,323,972 | 6/1994 | Kjellqvist | 384/121 X |

Primary Examiner—Thomas R. Hannon
Attorney, Agent, or Firm—Alix, Yale & Ristas, LLP

[57] ABSTRACT

A hydraulic axial bearing for a radially-mounted axle (1), which has a flange (1a) incorporating an outer, substantially axial sealing gap (7) formed between the flange and a sealing ring (3), and an inner, substantially radial sealing gap (9), formed between the axle and a sealing ring (5a) confined in the bearing housing (5). A hydraulic pressure medium is supplied, through the line (D) to the cavity (11) formed between the sealing gaps, whereupon the medium is evacuated through the gaps, under a considerable drop in pressure, to absorb axial loadings applied to the axle. The outer axial gap can be controlled by an additional pressure medium that is supplied to the pressure chamber (5b) via the line (D). This permits the pressure in the cavity (11) and consequently the axial loadings absorbed, to be regulated.

8 Claims, 3 Drawing Sheets

HYDRAULIC AXIAL BEARING

CROSS-REFERENCE TO RELATED APPLICATIONS

This is the national stage of International Application No. PCT/US96/01435 filed Feb. 6, 1996.

BACKGROUND OF THE INVENTION

The present invention relates to a hydraulic axial bearing for a radially-supported rotatable shaft or axle.

There is a need within many fields of technology for an axially-adjustable bearing system, which can withstand heavy and variable axial thrust loads. One example of this is in the cellulose processing industry, where a multi-purpose axial mill can be subjected to thrust loads on the order of 100 tons, while at the same time having to satisfy high demands for accuracy in axial positioning, in order to achieve an exact grinding gap.

A similar axial bearing system is known from the PCT publication WO 88/03611, which contains a detailed description of the general requirements for a hydrostatic bearing system and hydrostatic axial-bearing systems of the prior art.

The axial bearing system mentioned in the PCT publication uses two hydrostatic axial bearings, one on either side of a flange-like pressure plate which is anchored to the shaft or is formed integrally with it. Another system is shown in SE 464 370, where two flanges are used instead of one, with the bearings acting in opposed directions, away from one another.

Both these designs have practical limitations, mainly in respect of the difficulty of maintaining the inner and outer sealing gaps at the same height in spite of deflections caused by loads and thermal expansion. A deviation as small as 1/100 mm can have disastrous consequences. In addition, the bearing is relatively heavy, with a high moment of inertia, which is a great disadvantage in absorbing vibrations of the flange. The bearing is also very expensive due to its weight.

SUMMARY OF THE INVENTION

The purpose of the present invention is to provide an hydraulic axial bearing arrangement without the drawbacks mentioned above, and with a higher loading capacity and lower energy losses.

According to the invention, an hydraulic axial bearing for a radially supported rotating shaft, has a fixed flange, a substantially axial sealing gap formed between the flange and an outer sealing ring, and an inner, substantially radial sealing gap formed between the shaft and an inner sealing ring confined in the bearing housing, and means for supplying hydraulic pressure medium to the cavity formed between the sealing gaps, to absorb the axial loadings applied to the axle. Preferably, two such bearings are provided, one on each axial side of the flange.

The advantages, compared to the systems in the previously-mentioned publications, will be evident to the professional in this field:

1. One axial sealing gap for each bearing, instead of two, will be insensitive to deviations and thermal expansion of the flange and bearings.

2. The pressurized medium for the cavities between the sealing gaps need not be supplied through the bearings.

3. The outer sealing ring has low mass, and consequently low moment of inertia, resulting in a closer adaptation to the vibrations of the flange.

4. An inner radial gap provides a larger utilized hydraulic area, which provides a higher loading capacity.

5. Energy consumption is lower, since the inner gap is closer to the center line.

DESCRIPTION OF THE PREFERRED EMBODIMENT

Figure 1:
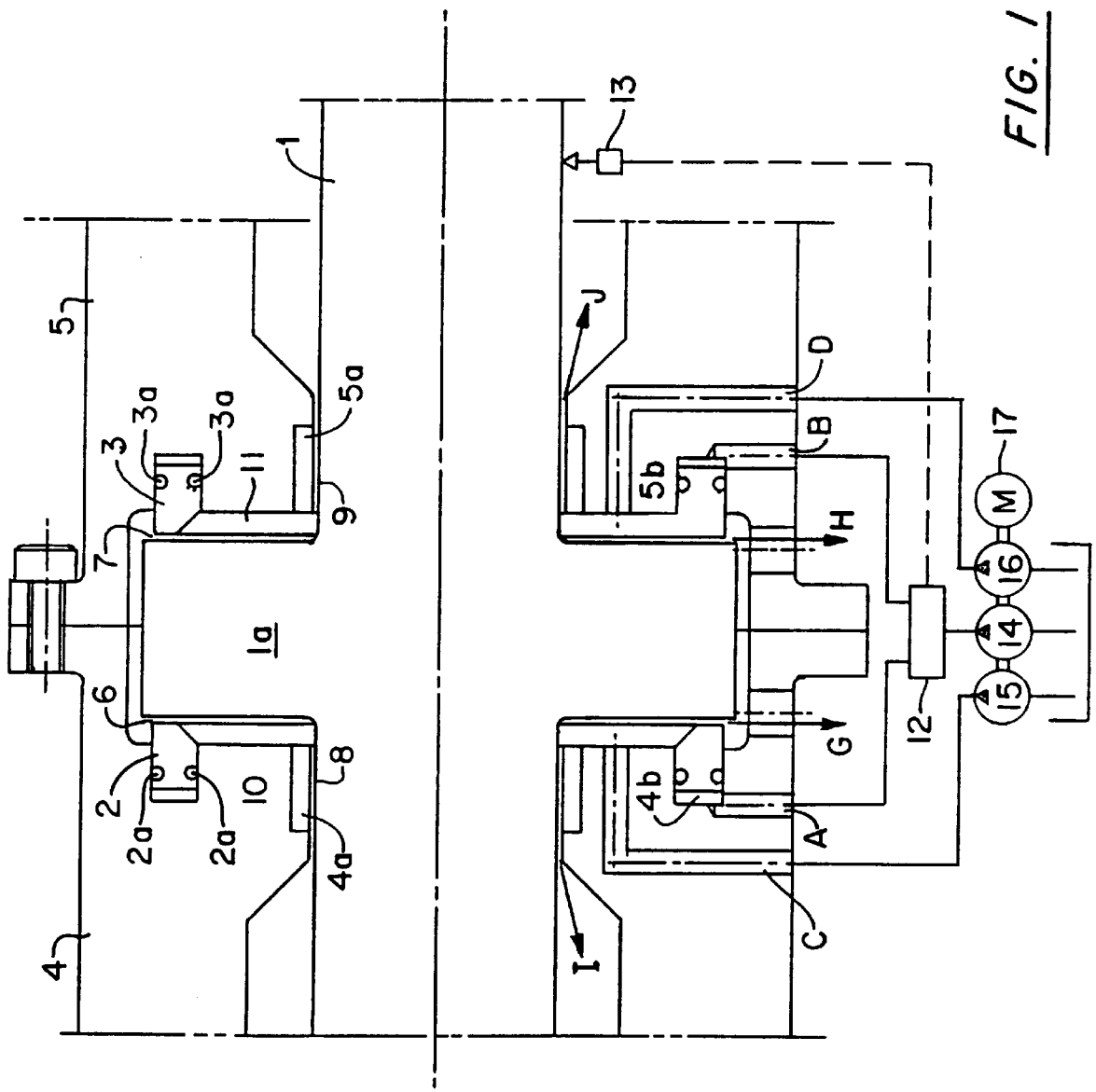
FIG. 1 shows a double-sided bearing arrangement as incorporated in the invention.

According to FIG. 1, the axle 1 or shaft is radially mounted or supported at a distance from one or both sides of a fixed flange 1a. In each of two axially opposed bearing housings, 4, 5, surrounding the flange 1a, there is an outer, axial sealing ring 2 and 3 respectively, which can be displaced within its outer pressure chamber, 4b and 5b, and sealed by means of the seals 2a and 3a respectively. In each bearing housing 4, 5, there is also an inner radial sealing ring 4, 5, which forms an essentially fixed sealing gap, 8, 9 with the axle.

A hydraulic pressure medium is applied from the pumps 15 and 16, through the lines C and D to the cavities 10 and 11 formed between sealing gaps 2, 3 and 8,9, by the flange 1a, the axial sealing rings 2, 3, portions 4',5' of the housing 4, 5 and the inner radial sealing rings 4a, 5a. This medium is expelled from the cavities through the fixed radial gaps 8, 9, and the adjustable outer, axial sealing gaps 6, 7, which causes a drop in pressure that affects the flange 1a. A hydraulic pilot valve 12, fed by pressure from the pump 14, driven by the motor 17, actuates the sealing rings 2, 3, through the lines A, B, to close the outer sealing gaps in proportion to the current axial load. For this control, the pilot valve is assisted by a sensor 13 which monitors the position of the axle. The evacuation flow is indicated in the figure by I, J and G, H respectively.

Figure 2:
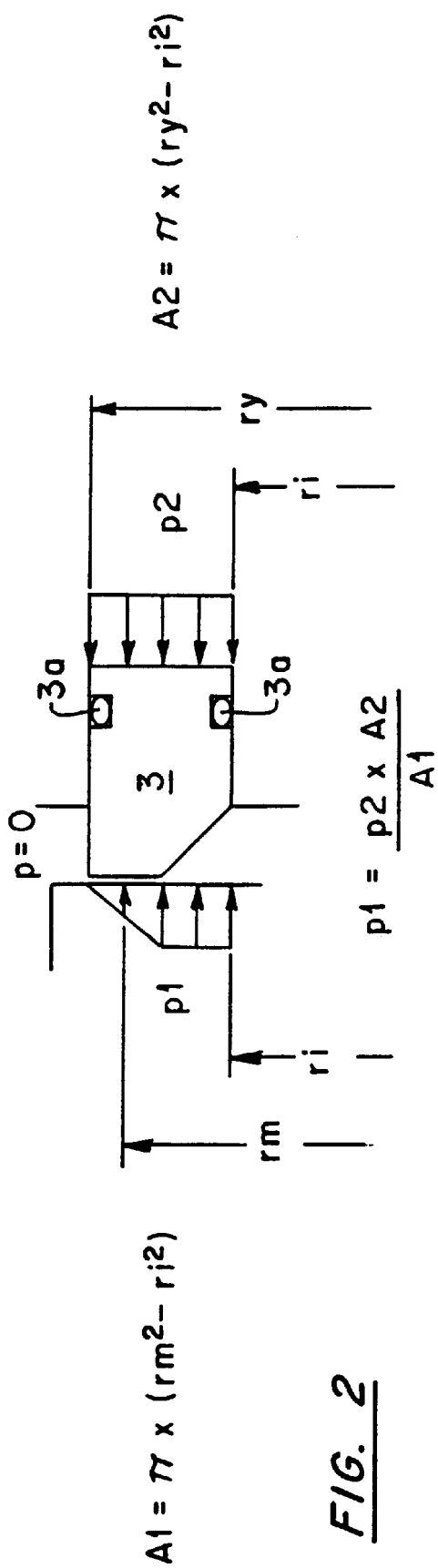
FIG. 2 shows an exposed and enlarged axial sealing ring, in which the pressure in the cavity is explained as a function of the geometry and the pressure applied to the pressure chamber by the pilot valve.

FIG. 2 shows an exposed and enlarged axial sealing ring, in which the pressure in the cavity is explained as a function of the geometry and the pressure applied to the pressure chamber by the pilot valve. In this way, the pilot valve can be programmed to keep the axle in a certain position irrespective of external loadings, and to adjust the position of the axle during operation.

Figure 3:
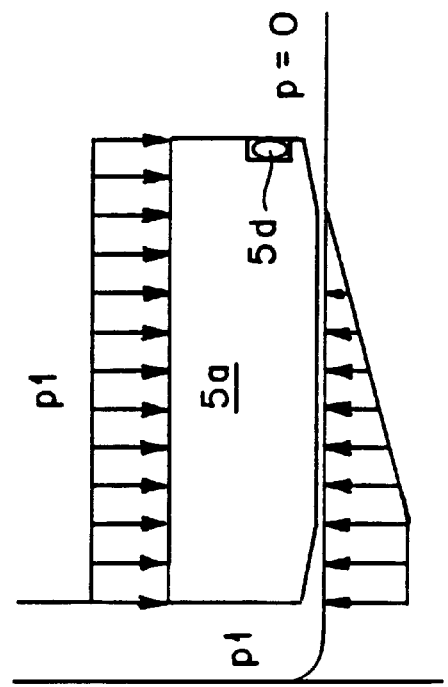
FIG. 3 shows an enlargement of the inner sealing ring, illustrating the drop of pressure of the medium along the radial gap.

FIG. 3 shows an enlargement of the inner sealing ring 5a, illustrating the drop of pressure of the medium along the radial gap. One modification in this connection would be to permit the pressure p1 in each cavity 10,11 to act radially inwardly upon the outer circumference of the sealing ring 4a, 5a, at p1' by means of a seal 4d, 5d against housing 4, 5. Thus, the diameter of the sealing ring, i.e., the height of the sealing gap 9, decreases as the loading increases. The drainage flow at p=0 through I,J does not therefore increase in direct proportion to an increasing thrust. Alternatively, pressure at p1' could be supplied from the pressure medium acting on outer pressure chambers 4b and 5b.

Figure 4:
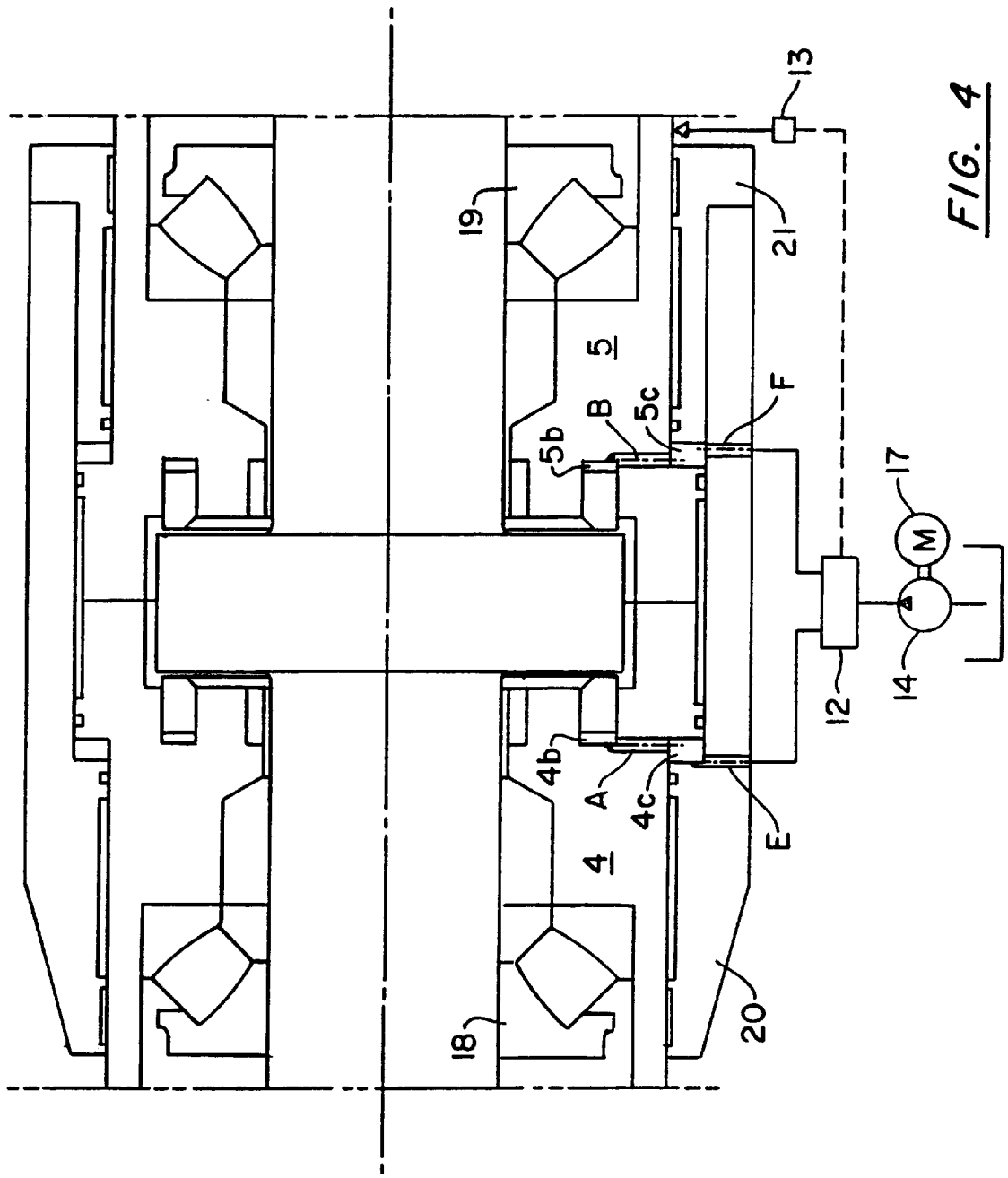
FIG. 4 shows a practical application of a double-sided bearing arrangement according to the invention.

FIG. 4 shows a practical application of a double-sided bearing arrangement according to the invention. The axle is mounted in spherical axial roller bearings 18 and 19, to have a radial mounting free from play but with some axial load-absorbing capacity. The bearing housings 4, 5 form the piston in a linear hydraulic motor with the outer cylinder 20, 21. The linear hydraulic motor has two pressure chambers 4c, 5c. The volume and pressure of hydraulic medium is regulated via the lines E, F by means of a hydraulic pilot valve 12 and a position sensor 13.

Pressure chambers 4c and 5c communicate directly with the respective pressure chambers 4b and 5b of the bearing, through the lines A and B, in order to absorb the axial loadings applied to the hydraulic motor, in the manner of "slave" bearings.

The hydraulic motor is thus operated to adjust the axial position of the axle, and the hydraulic bearings are applied to absorb axial loadings, which can vary in weight and direction.

The hydraulic pressure medium described in FIG. 1, which is applied to the cavities 10 and 11, is not shown in the FIG. 4, but is of course necessary for the correct operation of the bearing arrangement.

What is claimed is:

1. Hydraulic axial bearing formed within a bearing housing for a radially-mounted shaft (1) incorporating a fixed flange (1a), characterized by an outer, substantially axial sealing gap (7), formed between the flange and an outer sealing ring (3) supported in the bearing housing, and an inner, substantially radial sealing gap (9) formed between the shaft and the bearing housing or an inner sealing ring (5a) confined in the bearing housing, such that a cavity (11) is formed between the sealing gaps, and by means (D) for supplying hydraulic pressure medium to the cavity (11) to absorb the axial loadings applied to the shaft.

2. Hydraulic axial bearing as in claim 1, characterized in that the outer sealing ring (3) can be displaced axially by hydraulic pressure supplied to an outer pressure chamber (5b), formed between the sealing ring (3) and the housing (5) to control the pressure in the cavity (11) and thereby also the axial loading applied to the flange.

3. Hydraulic axial bearing as in claim 2, characterized in that two bearings each having respective outer pressure chambers (4b, 5b) in housings (4, 5), are arranged in opposite directions around one or two flanges.

4. Hydraulic axial bearing as in claim 3, characterized by the incorporation of a pilot valve (12) which, together with a shaft-position sensor (13), regulates the quantity and pressure of hydraulic medium to the two outer pressure chambers (4b, 5b), in order to absorb the axial loading and to permit its axial displacement.

5. Hydraulic axial bearing as in claim 4, characterized by the bearing housings (4, 5) forming a piston in a linear hydraulic motor (20, 21) where said pilot valve (12) is fitted, which, together with said shaft-position sensor (13), regulates the quantity and pressure of hydraulic medium to the piston pressure chambers (4c, 5c) of the hydraulic motor in order to absorb the axial loading on the piston, the piston pressure chambers (4c, 5c) communicating directly with the outer pressure chambers (4b, 5b) in the bearing housings, so that both the hydraulic bearings absorb the outer axial loading applied to the hydraulic motor.

6. Hydraulic axial bearing as in any one of claims 1–5, characterized by the inner radial sealing rings (4a, 5a) being acted upon radially inwardly around their outer circumferences by hydraulic pressure medium in order to control the height of the inner gaps (8, 9).

7. Hydraulic axial bearing as in claim 6, characterized by the radial inward pressure (p1') originating from the pressure (p1) in the cavities (10, 11) which bears the axial loading.

8. Hydraulic axial bearing as in claim 6, characterized by the radial inward pressure originating from the hydraulic pressure medium in the outer pressure chambers (4b, 5b).

* * * * *